June 5, 1951 G. H. FUEHRER 2,555,404
GUIDE FOR DRILLING IMPLEMENTS
Filed May 17, 1946
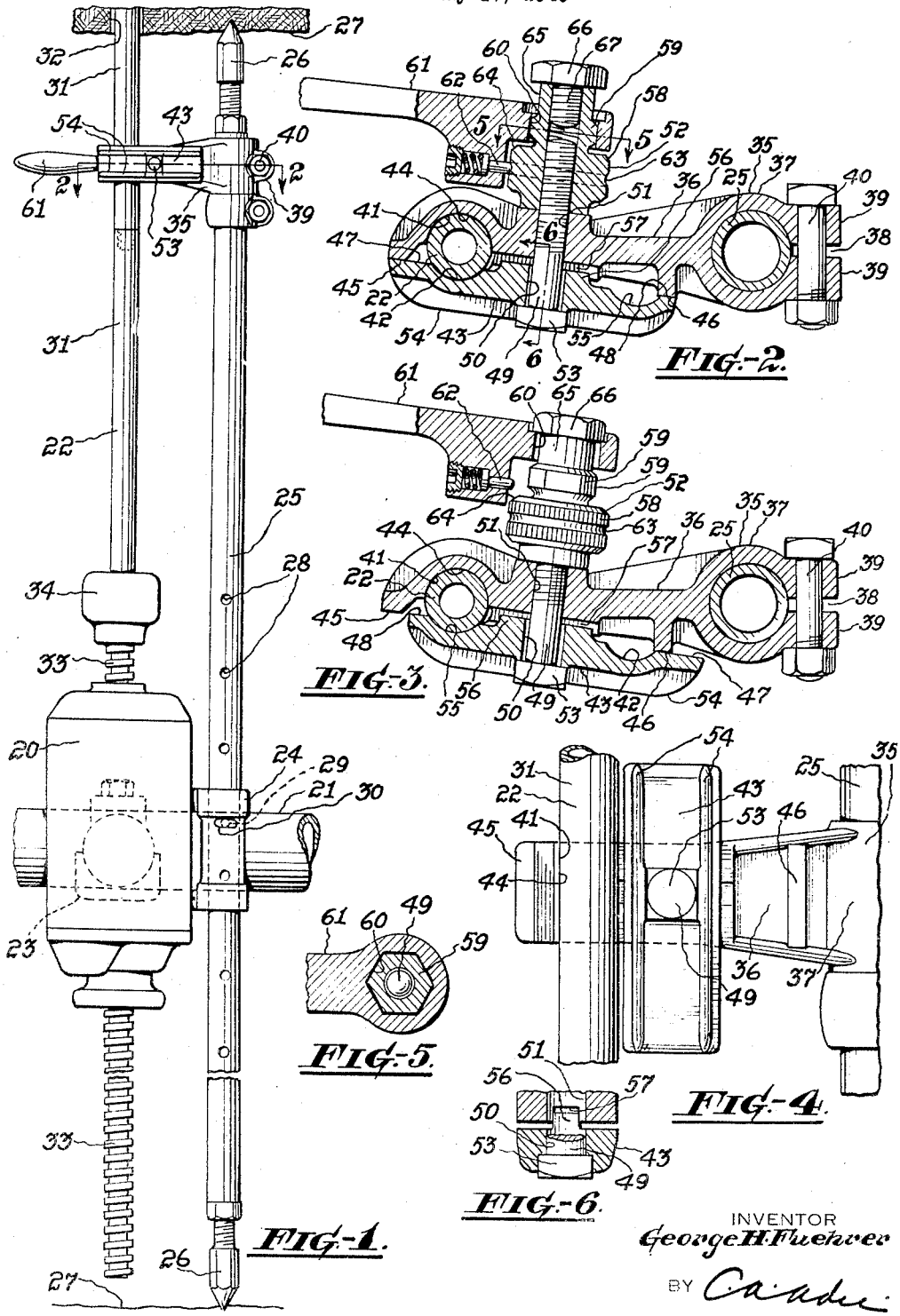
INVENTOR
George H. Fuehrer
BY
HIS ATTORNEY.

Patented June 5, 1951

2,555,404

UNITED STATES PATENT OFFICE 2,555,404

GUIDE FOR DRILLING IMPLEMENTS

George H. Fuehrer, Phillipsburg, N. J., assignor to Ingersoll-Rand Company, New York, N. Y., a corporation of New Jersey Application May 17, 1946, Serial No. 670,421

2 Claims. (Cl. 255—51)

This invention relates to rock drilling mechanism of the rotary type serving to actuate drilling implements consisting of sections suitably connected together, and more particularly to a guide for drilling implements of this type.

One object of the invention is to stabilize the overhanging portion of the drilling implement and thereby maintain its cutting end in axial alignment with the drilling machine.

Another object is to enable the guide to be used as a vise to hold the drilling implement immovable and to support its weight during the operations of lengthening and shortening the drilling implement.

Other objects will be in part obvious and in part pointed out hereinafter.

In the drawings accompanying this specification and in which similar reference numerals refer to similar parts, Figure 1 is a side elevation of a rock drilling mechanism equipped with a guide constructed in accordance with the practice of the invention, Figure 2 is a transverse view taken through Figure 1 on the line 2—2 showing the parts of the guide positioned for guiding a drilling implement, Figure 3 is a similar view showing the parts in position to clamp the drilling implement to the guide, Figure 4 is a top plan view of the guide showing the parts in the positions they will occupy for releasing the drilling implement from the guide, and Figures 5 and 6 are transverse views taken through Figure 2 on the lines 5—5 and 6—6, respectively.

Referring more particularly to the drawings, 20 designates, in general, a drilling machine mounted upon a column or bar 21 for rotating and imparting feeding movement to a drilling implement 22.

The drilling machine may be secured to the bar 21 by any suitable clamping device 23 and has an enlargement 24 on a side thereof to receive slidably a bar 25 having adjustable pointers 26 at its ends to engage supporting surfaces 27 for stabilizing the drilling machine. The bar has holes 28 spaced along its length to register with an aperture 29 in the enlargement 24, and a pin 30 extending through the aperture into one of the holes 28 secures the bar 25 to the enlargement.

The drilling implement may be of any well known type consisting of a plurality of tubular rod sections 31 that are threadedly connected together at their ends and one end section 31 carries a cutting bit (not shown) for drilling a hole 32 in the work. The opposite end of the drilling implement is secured to the feed screw 33 of the drilling machine by a chuck 34.

The bar 25 is arranged in parallelism with the drilling implement 22, and the end portion of said bar adjacent the working surface supports a guide 35 comprising an arm 36 having a split hub 37 at one end portion to receive the bar 25, and on the opposite sides of the slot 38 in the hub are lugs 39 and a bolt 40 extends therethrough for clamping the arm to the bar 25.

Near the opposite end and in the side surface of the arm 36 is a partly circular groove 41 that lies in parallelism with the hub 37 and cooperates with a similar groove 42 in the opposed surface of a plate 43 overlying the side of the arm 36 to define a guideway 44 for the drilling implement 22. The arm 36 has flatted surfaces 45 and 46 which are located, respectively, forwardly of the groove 41 and immediately forwardly of the hub 37 and serve as seats for surfaces 47 and 48 on the plate 43. The plate is held against the arm by a bolt 49 extending through apertures 50 and 51 in the plate and the arm, respectively, and by a nut 52 on the bolt seating against the arm. The head 53 of the bolt lies between a pair of reinforcing ribs 54 extending along the outer surface of the plate 43 to prevent relative rotation between the plate and the bolt.

To the end that the guide may also be used as a vise for holding the drilling implement immovable and to support its weight so that sections 31 may be conveniently attached to the drilling implement or removed therefrom, the plate 43 serves the additional function of a clamping member. It is accordingly provided in the end portion adjacent the seating surface 48, and in the surface containing the groove 42, with a second groove 55 which conforms with the curvature of the drilling implement.

The grooves 42 and 55 are spaced equi-distantly from the aperture 50 but at different distances from the adjacent ends of the plate 43, the groove 55 being nearer an end of the plate than the groove 42. Owing to this arrangement, the only points of contact between the arm 36 and the plate 43 will be between the seating surfaces 46 and 47 when the plate is positioned to place the wall of the groove into engagement with the drilling implement, in the manner shown in Figure 3 of the drawings. The plate will then be free to tilt relatively to the arm in response to force applied through the medium of the bolt 49 and the nut 52 for securing the drilling implement to the guide.

In order that the plate 43 may be conveniently retained in the correct operative positions with respect to the drilling implement said plate is provided with a rib 56 on the side confronting the arm 36 to extend into a slot 57 in the arm, and the slot is of ample depth so that clearances will exist between the rib and the bottom of the slot in both the guiding and clamping positions of the plate.

The nut 52 is an elongated member having a pair of heads 58 and 59 for turning it. The head 58 is located adjacent the arm 36 and is roughened on its periphery to provide a suitable gripping surface for the hand of the operator. The head 59 is of smaller cross-sectional dimension than the head 58 and is of hexagonal shape to fit a similarly shaped socket 60 of a wrench 61 having a spring-pressed detent 62 for engagement with an annular groove 63 in the periphery of the head 58 to retain the wrench on the head 59. The side of the head adjacent the head 59 has a beveled surface 64 over which the detent 62 may slide to the periphery of the head 58 for engagement with the groove 63.

To the end that the wrench 61 may at all times be conveniently available for use on the head 59, the nut 52 is provided with a terminal portion 65 of cylindrical shape to support the wrench 61 when not in use. The wrench is retained on the portion 65 by the head 66 of a screw 67 threaded into the nut 52.

In practice, and when the plate 43 is positioned to assist in guiding the drilling implement 22, the surfaces 47 and 46 will seat upon the surfaces 45 and 48 and will be clamped thereagainst by the bolt 49 and the nut 52. In this position of the plate the drilling implement may rotate freely with respect to the guide and will be retained thereby in substantial axial alignment with the drilling machine 20 and the drill hole.

Whenever it is intended to remove the drilling implement from the drill hole, the drilling machine 20 is first rocked out of alignment with the drilling implement, in the usual manner, and the drilling implement is retracted until a joint connecting two sections 31 lies between the guide and the drilling machine. The plate 43 is then placed in the clamping position shown in Figure 3 and drawn against the drilling implement by means of the bolt 49 and the nut 52 to clamp the drilling implement against the arm 36. A rod section may then be conveniently removed by one attendant without danger of a shortened drilling implement dropping back into the hole. This operation may be repeated until all the sections 31 have been disconnected from each other. Similarly, whenever it is desired to assemble a drilling implement for insertion into an existing drill hole, each section is held immovable by the guide until another section has been added to the string.

I claim:

1. A guide for drilling implements, comprising an arm having a hub at one end and a groove adjacent the other end to slidably receive a drilling implement, a bolt in the arm between the hub and the groove, seats on the arm on opposite sides of the bolt, a plate on the bolt to bear against the seats in one position of said plate for cooperation with the groove to define a guideway for guiding the drilling implement and being rotatable on the bolt to another position for engagement with such drilling implement and only one of the said seats for holding the drilling implement immovable in the groove, and means on the bolt for imparting clamping pressure thereto in both positions of the plate.

2. A guide for drilling implements, comprising an arm having a hub at one end and a groove adjacent the other end to slidably receive a drilling implement, a bolt in the arm between the hub and the groove, a seat on the arm between the hub and the bolt, a seat on the arm adjacent the groove, a plate rotatable on the bolt to bear in one position of said plate against both seats for cooperation with the groove to define a guideway for guiding the drilling implement and to bear against only the first mentioned seat and such drilling implement in another position of the plate for holding the drilling implement immovable in the groove, and means on the bolt for imparting clamping pressure thereto in both positions of the plate.

GEORGE H. FUEHRER.

REFERENCES CITED

The following references are of record in the file of this patent:

UNITED STATES PATENTS

| Number | Name | Date |
|---|---|---|
| 927,381 | Scoggins | July 6, 1909 |
| 1,115,594 | Shallenberger | Nov. 3, 1914 |
| 1,203,145 | Sheppard | Oct. 31, 1916 |
| 1,352,810 | Hunt | Sept. 14, 1920 |
| 1,632,400 | Gilman | June 14, 1927 |
| 1,644,026 | Mock | Oct. 4, 1927 |
| 1,986,266 | Hirschberg | Jan. 1, 1935 |